United States Patent [19]

Bloch et al.

[11] Patent Number: 4,720,220
[45] Date of Patent: Jan. 19, 1988

[54] TOOL FOR MACHINING TOOTH FLANKS AND METHOD OF FINISHING TOOTH FLANKS

[75] Inventors: Peter Bloch; Rudolf Fischer, both of Mutschellen; Roman Schwaighofer, Geroldswil, all of Switzerland

[73] Assignee: Maag Gear Wheel & Machine Co. Ltd., Zurich, Switzerland

[21] Appl. No.: 819,399

[22] Filed: Jan. 16, 1986

Related U.S. Application Data

[63] Continuation of Ser. No. 459,358, Jan. 19, 1983, abandoned.

[30] Foreign Application Priority Data

Feb. 2, 1982 [CH] Switzerland ............... 615/82

[51] Int. Cl.$^4$ ........................................... B23F 21/00
[52] U.S. Cl. ......................................... 409/33; 409/38; 409/47; 409/51; 409/58; 407/20; 407/27; 407/118; 407/119; 51/287
[58] Field of Search .................. 409/10, 31, 33, 37, 409/38, 40, 41, 42, 46, 47, 50, 51, 55, 56, 58; 407/20; 21, 27, 29, 118, 119; 51/287

[56] References Cited

U.S. PATENT DOCUMENTS

| | | | |
|---|---|---|---|
| 433,458 | 8/1890 | Eberhardt | 407/29 |
| 1,480,610 | 1/1924 | Harten | 407/20 |
| 1,963,756 | 6/1934 | Merz | 409/56 |
| 2,392,278 | 1/1946 | Wildhaber | 407/29 |
| 3,745,623 | 7/1973 | Wentorf, Jr. et al. | 407/119 |
| 4,437,800 | 3/1984 | Araki et al. | 407/119 |
| 4,557,639 | 12/1985 | Fischer | 407/20 |

FOREIGN PATENT DOCUMENTS

| | | | |
|---|---|---|---|
| 19461 | 11/1980 | European Pat. Off. | 407/119 |
| 1135730 | 8/1962 | Fed. Rep. of Germany | 407/27 |
| 2517288 | 1/1976 | Fed. Rep. of Germany | 407/119 |
| 2630406 | 2/1977 | Fed. Rep. of Germany | 409/38 |
| 2934345 | 9/1980 | Fed. Rep. of Germany | 409/38 |
| 632509 | 11/1978 | U.S.S.R. | 407/27 |

OTHER PUBLICATIONS

Aaron Deutschman et al, *Machine Design: Theory and Practice*, 1975, pp. 534–536.

Primary Examiner—Gil Weidenfeld
Assistant Examiner—Daniel W. Howell
Attorney, Agent, or Firm—Werner W. Kleeman

[57] ABSTRACT

For machining the tooth flanks of a hardened workpiece having pre-formed teeth two cutting blades or plates are secured to a cutting blade or plate holder. The cutting blades or plates are provided with a base member or backing formed of a hard metal and a cover layer sintered thereon which is formed of cubic boron nitride. Each cutting blade forms a cutting surface and a clearance surface. Each individual cutting blade or plate is arranged at the cutting blade or plate holder in relation to the direction of the intended cutting movement such that the surface of the cover layer forms the clearance surface and an end face or surface of the cover layer is located in the cutting surface. Consequently, there is achieved the result that the cutting surface can be reground in the same manner as tools which, for example, are made of hardened steel and which are not provided with a cover layer.

15 Claims, 9 Drawing Figures

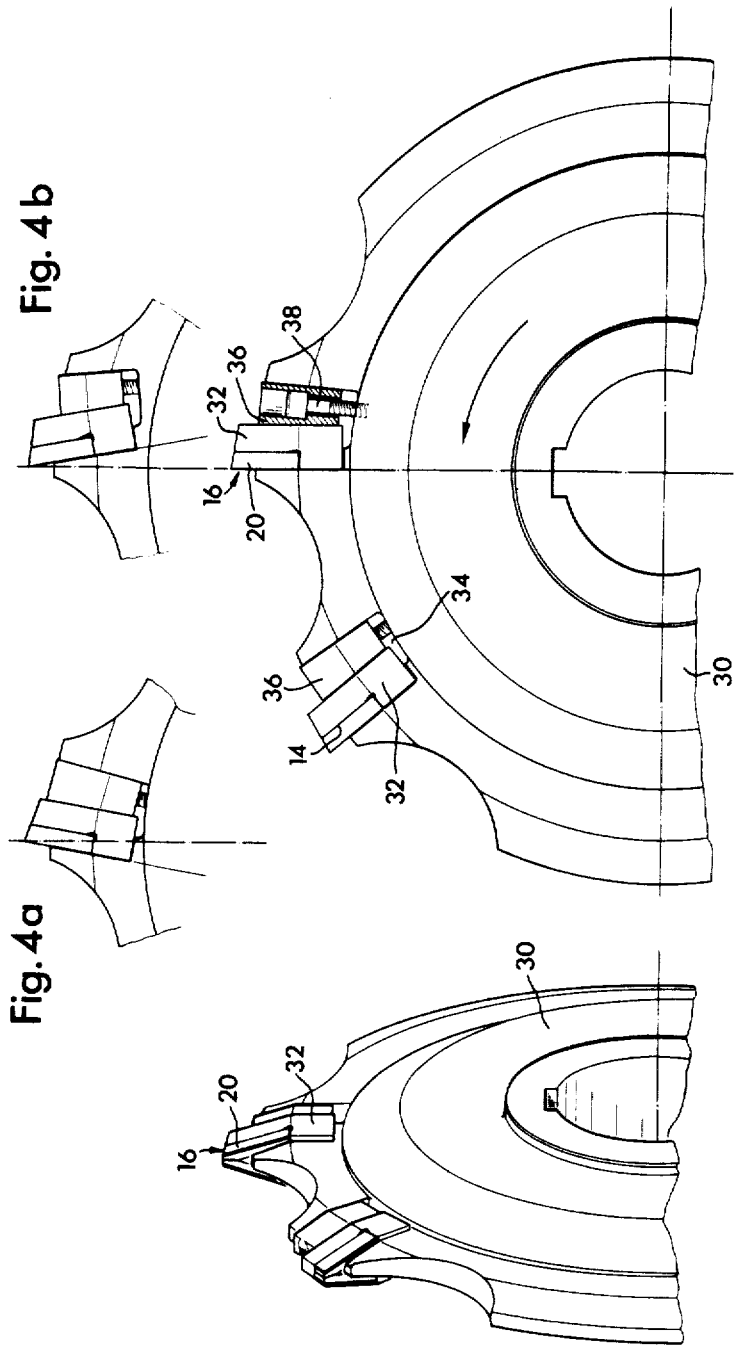

TOOL FOR MACHINING TOOTH FLANKS AND METHOD OF FINISHING TOOTH FLANKS

CROSS REFERENCE TO RELATED APPLICATION

This application is a continuation application of our commonly assigned, copending U.S. application Ser. No. 459,358, filed Jan. 19, 1983, and entitled "Tool For Machining Tooth Flanks".

BACKGROUND OF THE INVENTION

The present invention relates to a new and improved tool for machining tooth flanks, in particular the tooth flanks of a hardened workpiece having pre-formed teeth, and also pertains to a method of finishing or microfinishing tooth flanks.

In its more particular aspects the tool of the present development is of the type comprising at least one cutting blade or plate holder and at least one cutting blade or plate mounted or fastened thereto. The cutting blade comprises a base member or backing, particularly made of a hard metal, typically tungsten carbide, and a sintered-on cover layer formed of a very hard polycrystalline cutting material, in particular cubic boron nitride. The cutting blade forms a cutting surface and a clearance surface.

A cutting blade is known from the Journal "Werkstatt and Betrieb", Volume 114, Issue No. 1, pages 45 to 49, 1981 which comprises a hard metal base member having a thickness of 4.76 mm and a cover layer made of cubic boron nitride having a thickness of 0.89 mm which is sintered onto the base member at high pressure and high temperature. Such cutting blades have been successfully employed for machining or turning hardened steels. To that end the cutting blades have been chucked in a clamping holder such that the surface of the cover layer made of cubic boron nitride formed the cutting or rake surface and there resulted a tool geometry having a negative rake angle of $-6°$.

The applicants have found that such cutting blades are also suited for chip machining tooth flanks, particularly hardened tooth flanks. The unavoidable intermittent action of the tool upon the workpiece, however, increases the danger that the sintered-on cover layer will crumble away at the cutting edges. For this reason and because of the generally high surface finish requirements which are placed upon the tooth flanks, in particular upon hardened tooth flanks which are not subsequently ground, it is necessary to specifically observe that the cutting blades are maintained in a sharp condition by timely re-grinding the same. In so doing, however, care must be taken to ensure that the profile of the tool, which for the machining of tooth flanks, such as gear tooth flanks, generally corresponds to a rack or to an individual tooth or to an individual tooth flank of a rack, is preserved as precisely as possible. It is therefore general practice to re-grind the tools used for chip machining tooth flanks only at their cutting or rake surfaces. When, however, the cutting blades or plates are arranged in conventional manner such that the sintered-on cover layer forms the cutting surface, then special experience and apparatus are required for regrinding this cutting surface, which are only available in specialized plants or enterprises.

SUMMARY OF THE INVENTION

Therefore, with the foregoing in mind it is a primary object of the present invention to provide an improved tool for machining tooth flanks which can be maintained in a sharp condition without any specific expenditure and substantially by using the knowledge and equipment generally available in gear cutting establishments or plants.

Another important object of the present invention is directed to an improved method of finishing or microfinishing tooth flanks by means of such tools.

Now in order to implement these and still further objects of the invention, which will become more readily apparent as the description proceeds, the tool of the present development is manifested by the features that, a surface and at least one end face are formed by the cover layer. The end face is relatively narrow. Each cutting blade is arranged at the cutting blade holder with respect to the direction of the intended cutting movement in such a manner that the surface of the cover layer forms the clearance surface and the one relatively narrow end face of the cover layer is disposed within the cutting surface of the tool to form a relatively minor portion thereof.

There is thus achieved the result that the cutting surface can be re-ground in the same way as in tools which, for example, are formed of hardened steel and which are not provided with a cover layer.

For simultaneously finishing or microfinishing confronting tooth flanks of two adjacent teeth in a workpiece employing a generating or rolling operation the cutting blades are combined obliquely or at an inclination with respect to each other in pairs in which the cover layers face away from one another in order to form a shape corresponding to that of a toothed rack. Tools constructed in accordance with this further development of the invention may be selectively designed as cutting tools or as milling tools or hobs. In both cases the reference profile of the teeth to be produced can be reproduced by the pairwise combined cutting blades.

In the event that two tooth flanks which face away from each other in a workpiece are intended to be simultaneously finished or microfinished by employing a rolling or generating motion, it will be expedient if the cutting blades are mounted obliquely or at an inclination with respect to each other in pairs at two coaxially arranged discs with the sintered-on cover layers facing each other.

For finishing or microfinishing one respective tooth flank employing a rolling or generating motion there is also suitable a tool in which, in accordance with the invention, the cutting blades or plates are arranged at the rim of a plate-like disc or disc member such that the surfaces of the cover layers form end face sections of the tool. Such a tool is similar in shape to a conventional plate-shaped or dished grinding wheel or disc for grinding tooth flanks in a conventional partial rolling or generating motion. In a manner corresponding to such conventional grinding wheels or discs, the tools constructed according to the invention as just described hereinbefore, also may be employed in pairs to finish or microfinish two respective tooth flanks facing each other or facing away from each other.

In a tool of the design last described hereinbefore the cutting blades are each preferably fastened to a respective cutting blade holder using a threaded bolt or screw which extends through the cutting blade at right angles to the surface of the sintered-on cover layer; the cutting blade holder is designed to protrude from a plate-like disc. By virtue of such design of the cutting blade holder the cutting angle and the clearance angle may be established once and for all when there are used cutting blades with parallel faces.

When using a plate-like tool of the design as described hereinbefore tooth flanks can be finished or micro-finished in such a manner that the plate-like disc is driven at a rotational speed at which the average circumferential speed of the cutting blades or plates is in the range of 10 to 50 m/s, preferably 30 m/s.

As mentioned previously the invention also is concerned with a method of finishing or microfinishing tooth flanks by means of a rolling operation and by using a tool comprising a cutting blade incorporating a base member and a sintered-on cover layer of an extremely hard polycrystalline cutting material, the cutting blade forming a cutting surface and a clearance surface and said cover layer defining a surface and at least one relatively narrow end face. Such method comprising the steps of arranging a number of cutting blades at a rim of a substantially plate-shaped disc such that each said surface of the cover layers forms an end face section of said tool and each said relatively narrow end face of said cover layers forms a relatively minor portion of said cutting surface of each said cutting blade, and driving said plate-shaped disc at a rotational speed at which the average circumferential speed of said cutting blades is in the range of 10 to 50 m/s.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 is a perspective view of a tool constructed according to the invention for hobbing or milling gears by means of a partial rolling or generating operation;

FIG. 4 is a to plan view of the tool shown in FIG. 3;

FIGS. 4a and 4b are respective fragmentary detail views;

DETAILED DESCRIPTION OF THE PREFERRED EMBODIMENTS

Figure 1:
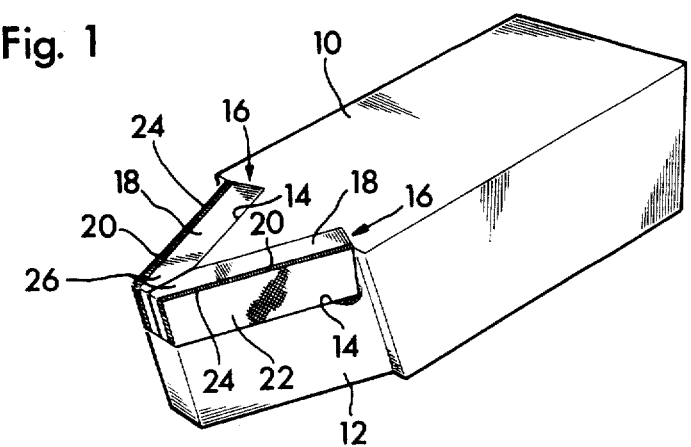
FIG. 1 is a perspective view of a tool constructed according to the invention for cutting teeth.

Describing now the drawings, it is to be understood that in order to simplify the illustration only enough of the construction of the tool and related equipment or structure has been shown as needed for those skilled in the art to readily understand the underlying principles and concepts of the present invention. Turning now specifically to FIG. 1 of the drawings, there has been illustrated therein in a perspective view of an exemplary embodiment of a tool having a shank 10, one end of which is structured as a cutting blade holder 12 having two blade or plate seats 14. A respective cutting blade or plate 16 is, for instance, soldered into each one of the two blade seats 14. Each of the two cutting blades 16 comprises a base member or backing 18 having a thickness of about 4 to 6 mm and a cover layer 20 sintered thereon and having a thickness of about 0.8 to 1.0 mm. The base member 18 is made of a hard metal, typically tungsten carbide, and the cover layer 20 is made of cubic boron nitride (CBN).

The surface of the cover layer 20 of each of the two cutting blades 16 is substantially flat or planar and forms a clearance surface 22 contiguous to a main cutting edge 24. One of the narrow sides or edges or end face of the cover layer 20 of each one of the two cutting blades 16 constitutes a component part of a cutting surface 26 which is essentially formed by the base member 18 of the respective cutting blade or place 16. Each such narrow wide or relatively narrow end face forms a relatively minor portion of the related cutting surface 26. The cutting surfaces 26 are planar or slightly domed in the usual manner and ground such that a negative or a positive cutting angle results at the respective one of the two main cutting edges 24 of the illustrated tool.

Figure 2:
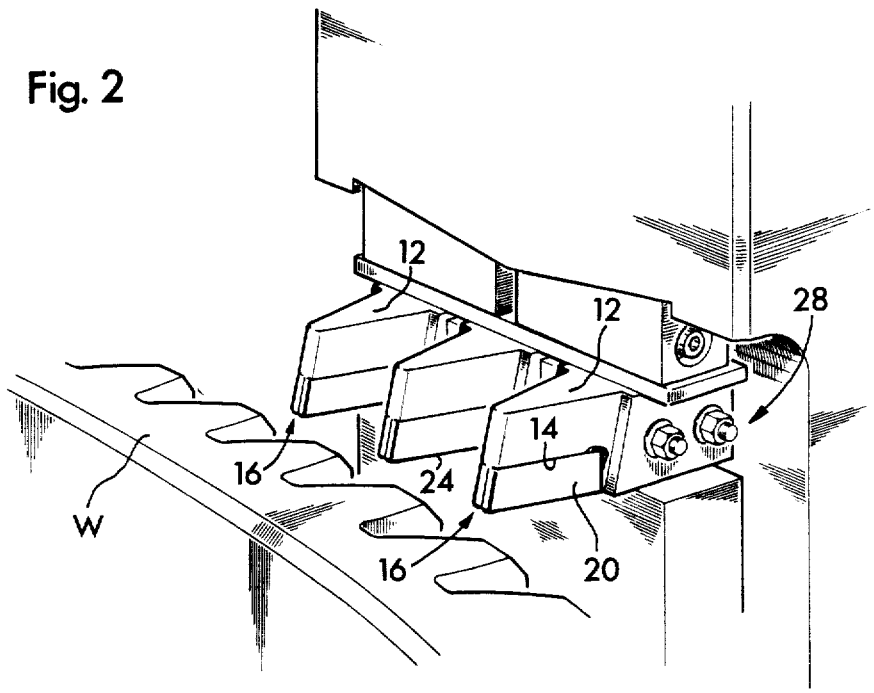
FIG. 2 is a perspective view of a group of tools as shown in FIG. 1 during cutting of a gear by means of a partial rolling or generating operation.

As shown in FIG. 2, a number of tools, for example, three tools of the design as shown in FIG. 1 may be assembled in a chucking or clamping device 28 to form a rack-type cutter by means of which a workpiece W forming a gear or a gear segment may be cut according to a partial rolling or generating operation.

The tool illustrated in FIGS. 3 and 4 of the drawings comprises a disc or disc member 30 which forms a main supporting member, and a number of cutting blade holders 32 are exchangeably mounted thereat substantially equidistantly with respect to one another. The cutting blade holders 32 are designed similar to the cutting blade holder 12 shown in FIGS. 1 and 2, and just like the cutting blade holder 12 each comprise two blade seats 14 into each of which there is soldered or otherwise appropriately affixed a respective cutting blade 16. The cutting blades or plates 16 as such are structured like those of the tools shown in FIGS. 1 and 2. Again, these cutting blades 16 are arranged such that they form one respective clearance surface 22 by means of their sintered-on cover layer 20, while the bounding or contiguous cutting surface 26 only incorporates a small marginal section or portion of the cover layer 20 and the remaining part thereof is formed by the base member 18 of the respective cutting blade 16.

In accordance with FIGS. 3 and 4, the cutting blade holders 32 are clamped in a related recess 34 formed in the disc or disc member 30 by mans of a wedge 36 which is tightened approximately radially towards the disc 30 by means of a threaded bolt or screw 38 extending therethrough.

Figure 5:
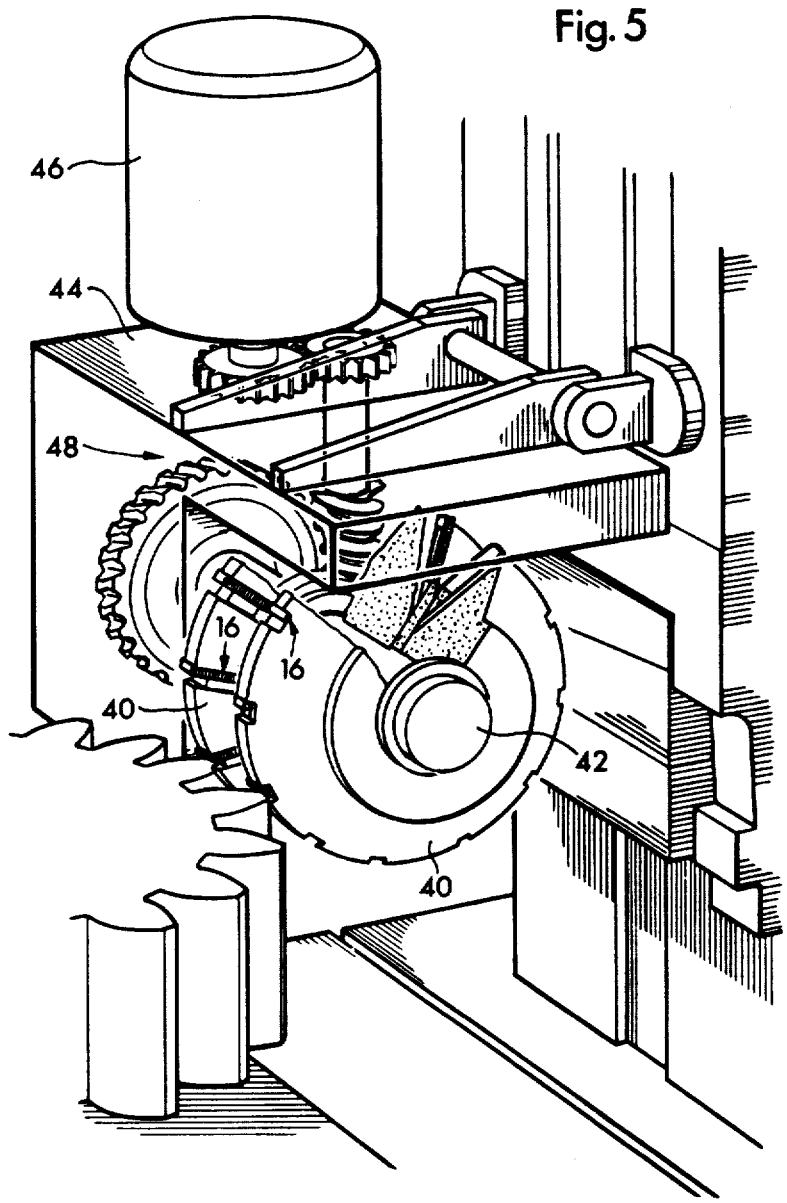
FIG. 5 is a perspective view of parts of a gear hobbing or milling machine containing two disc-like tools during hobbing or milling of two tooth flanks of a gear.

According to the arrangement of FIG. 5 two discs or disc members 40 are mounted at an adjustable axial spacing upon a common shaft 42 which is journalled in a slide 44 of a gear cutting machine and which may be driven by a drive motor 46 via a multi-stage or stepped transmission 48. Similar to the disc 30 of the arrangement of FIGS. 3 and 4, both of the discs 40 of the arrangement of FIG. 5 are equipped with cutting blades or plates 16 exchangeably mounted thereat at a substantially uniform angular distance from each other. However, in the arrangement of FIG. 5 the cutting blades 16 are only arranged at one side at each individual disc or disc member 40. In this case, also, the surface of the sintered-on cover layer 20 of each individual cutting blade 16 forms a clearance surface 22. The clearance surfaces 22 of the cutting blades 16 mounted upon the two milling or hob discs 40 are disposed so as to confront one another, so that two tooth flanks of a workpiece W facing away from one another may be simultaneously machined.

Figure 6:
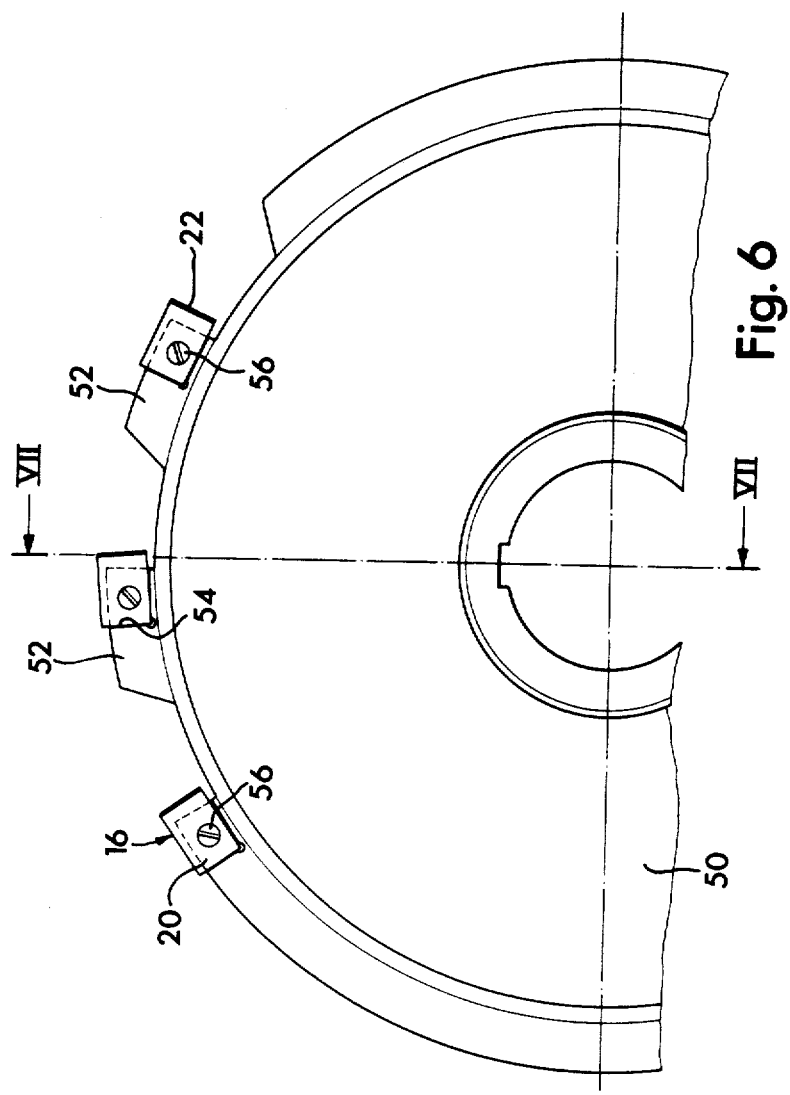
FIG. 6 is a top plan view of a grinding wheel-like tool constructed according to the invention.
Figure 7:
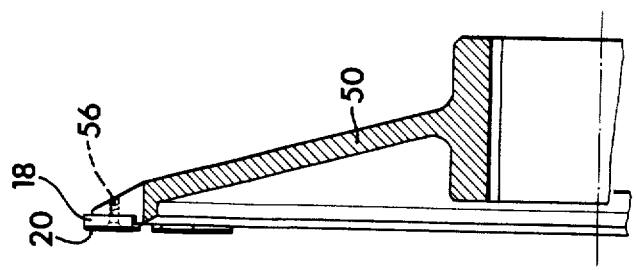
FIG. 7 is a sectional view taken along the line VII—VII of FIG. 6.

Finally, a substantially plate-shaped disc or disc member 50 is shown in FIGS. 6 and 7, at the outer rim of which numerous cutting blade holders 52 are formed integrally therewith at a substantially uniform angular spacing from one another, only three thereof however being shown as a matter of convenience in the illustration. A blade seat or mount 54 accommodating a cutting blade or plate 16 is formed in each cutting blade holder 52. Each cutting blade 16 is secured at the associated cutting blade holder 52 with the end of a respective threaded bolt or screw 56. In this case, also, the cutting blades 16 are arranged such that the surface of the cover layer 20 sintered thereon forms the clearance surface 22. Each threaded bolt or screw 56 piercingly extends through the associated cutting blade 16 proceeding from the clearance surface 22 and at right angles thereto.

While there are shown and described present preferred embodiments of the invention, it is to be distinctly understood that the invention is not limited thereto, but may be otherwise variously embodied and practiced within the scope of the following claims ACCORDINGLY,

What we claim is:

1. A tool for the material-removal machining of tooth flanks of a hardened workpiece having pre-formed teeth, said tool comprising:
   at least one cutting blade holder;
   at least one cutting blade mounted at said at least one cutting blade holder;
   said cutting blade comprising a base member and a sintered-on cover layer formed of an an extremely hard polycrystalline cutting material;
   said cutting blade forming a cutting surface and a clearance surface;
   said cover layer containing a surface and one relatively narrow end face; and
   each said cutting blade being arranged at said cutting blade holder with respect to a predetermined direction of an intended cutting movement such that said surface of said cover layer forms said clearance surface and said one relatively narrow end face of said cover layer is located in said cutting surface to form a relatively minor portion thereof.

2. The tool as defined in claim 1, wherein:
   said base member is formed of a hard metal.

3. The tool as defined in claim 2, wherein:
   said hard metal comprises tungsten carbide.

4. The tool as defined in claim 1, wherein:
   said extremely hard polycrystalline cutting material of said sintered-on cover layer is cubic boron nitride.

5. The tool as defined in claim 1, wherein:
   said tool is intended for simultaneously finishing or microfinishing confronting tooth flanks of two neighboring teeth in a workpiece having pre-formed teeth by means of a rolling operation;
   said cutting blades being combined obliquely with respect to each other in pairs in which said cover layers are disposed so as to face away from one another; and
   said pairwise combined cutting blades possessing a shape essentially corresponding to that of a toothed rack.

6. The tool as defined in claim 1, wherein:
   said tool is intended for simultaneously roughing and/or finishing and/or microfinishing tooth flanks of a number of neighboring teeth in a workpiece having pre-formed teeth by means of a rolling operation; and
   a number of pairs of said cutting blades are arranged in juxtaposition to each other to form a rack-type cutting tool.

7. The tool as defined in claim 5, wherein:
   a number of said pairs of said cutting blades are mounted at a respective cutting blade holder;
   a disc at the circumference of which said cutting blade holders including said pairs of said cutting blades are arranged;
   main cutting edges formed by intersection lines of said cutting surfaces and said clearance surfaces of each pair of said cutting blades; and
   said main cutting edges being arranged at least approximately in an axial plane with respect to said disc.

8. The tool as defined in claim 1, wherein:
   said tool is intended for simultaneously finishing or microfinishing two tooth flanks facing away from each other in a workpiece by means of a rolling operation;
   two substantially coaxially arranged discs; and
   said cutting blades being mounted at said disc obliquely with respect to each other in pairs in which said cover layers face each other.

9. The tool as defined in claim 8, wherein:
   main cutting edges of said cutting blades are disposed in a plane extending normally with respect to the axis of said disc associated therewith.

10. The tool as defined in claim 1, wherein:
    each of said tools is intended for finishing or microfinishing one respective tooth flank by means of a rolling operation;
    a substantially plate-shaped disc having a rim;
    a number of said cutting blades arranged at said rim of said disc; and
    end face sections of said tool being formed by said surfaces of said cover layers arranged at said disc and cutting surfaces of said tool being formed by said relatively narrow end faces of said cover layers.

11. The tool as defined in claim 10, further including:
    means for fastening each of said cutting blades to a respective one of said cutting blade holders;
    said fastening means extending through said cutting blade at substantially right angles with respect to said surface of said cover layer; and
    each said cutting blade holder protruding from said disc.

12. A method of finishing or microfinishing tooth flanks by means of a rolling operation and by using a tool comprising a cutting blade incorporating a base member and a sintered-on cover layer of an extremely hard polycrystalline cutting material, said cutting blade forming a cutting surface and a clearance surface and said cover layer defining a surface and at least one relatively narrow end face; said method comprising the steps of:
    arranging a number of cutting blades at a rim of a substantially plate-shaped disc such that each said surface of said cover layers forms an end face section of said tool and each said relatively narrow end face of said cover layers forms a relatively minor portion of said cutting surface of each said cutting blade; and driving said plate-shaped disc at a rotational speed at which the average circumferential speed of said cutting blades is in the range of 10 to 50 m/s.

13. the method as defined in claim 12, further including the step of:

driving said disc at a rotational speed at which said average circumferential speed of said cutting blades is about 30 m/s.

14. The method as defined in claim 12, including the step of:

fastening each of said cutting blades to a respective cutting blade holder protruding from said disc by fastening means extending through each related cutting blade at approximately right angles with respect to said surface of said cover layer of said related cutting blade.

15. The tool as defined in claim 1, wherein:

said relatively narrow end face of said cover layer has a relatively minor dimension in comparison to said clearance surface thereof.

* * * * *

UNITED STATES PATENT AND TRADEMARK OFFICE
CERTIFICATE OF CORRECTION

PATENT NO. : 4,720,220

DATED : January 19, 1988

INVENTOR(S) : PETER BLOCH et al

It is certified that error appears in the above-identified patent and that said Letters Patent is hereby corrected as shown below:

Column 1, line 11, after "Tooth Flanks," insert    --(now abandoned)--

Column 1, line 30, after "statt" please delete "and" and insert --und--

Column 3, line 46, after "a" please delete "to" and insert --top--

Column 4, line 18, please delete "wide" and insert --side--

Column 4, line 51, please delete "mans" and insert --means--

Signed and Sealed this

Twenty-first Day of June, 1988

Attest:

DONALD J. QUIGG

Attesting Officer

Commissioner of Patents and Trademarks